(12) United States Patent
Wang

(10) Patent No.: US 8,214,712 B2
(45) Date of Patent: Jul. 3, 2012

(54) METHOD FOR TRANSMITTING REAL-TIME STREAMING DATA IN A COMMUNICATIONS SYSTEM AND APPARATUSES UTILIZING THE SAME

(75) Inventor: Chao-Chun Wang, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 471 days.

(21) Appl. No.: 12/608,114

(22) Filed: Oct. 29, 2009

(65) Prior Publication Data
US 2010/0115366 A1   May 6, 2010

Related U.S. Application Data

(60) Provisional application No. 61/111,362, filed on Nov. 5, 2008.

(51) Int. Cl.
*G06F 11/00* (2006.01)
(52) U.S. Cl. .......... 714/748; 709/231
(58) Field of Classification Search ........... 714/748, 714/751; 709/231
See application file for complete search history.

(56) References Cited

U.S. PATENT DOCUMENTS

| | | | |
|---|---|---|---|
| 6,532,357 B1 | 3/2003 | Ichikawa | |
| 8,107,885 B2 * | 1/2012 | Love et al. | 455/67.11 |
| 2007/0104215 A1 * | 5/2007 | Wang et al. | 370/458 |
| 2008/0299921 A1 | 12/2008 | Liao | |
| 2009/0240998 A1 * | 9/2009 | Nikkila et al. | 714/746 |
| 2010/0042882 A1 * | 2/2010 | Randall | 714/748 |
| 2010/0074204 A1 * | 3/2010 | Meylan | 370/329 |
| 2010/0214992 A1 * | 8/2010 | Hart et al. | 370/329 |
| 2011/0047429 A1 * | 2/2011 | Kashima et al. | 714/748 |

FOREIGN PATENT DOCUMENTS

| | | |
|---|---|---|
| CN | 2697958 Y | 5/2005 |
| CN | 1735016 A | 2/2006 |
| CN | 1783768 A | 6/2006 |
| CN | 101242364 A | 8/2008 |
| JP | 2000286811 A | 10/2000 |
| WO | 2007111474 A1 | 10/2007 |

OTHER PUBLICATIONS

English abstract of CN1783768A; pub. Jun. 7, 2006.
English abstract of CN1735016A; pub. Feb. 15, 2006.
English abstract of CN101242364AA; pub. Aug. 13, 2008.
English abstract of JP2000286811; pub. Oct. 13, 2000.
English abstract of CN2697958Y; pub. May 4, 2005.

* cited by examiner

*Primary Examiner* — Marc Duncan
(74) *Attorney, Agent, or Firm* — Thomas|Kayden

(57) ABSTRACT

A communications system is provided. A first communications device requests one or more dedicated service periods, via a request, to transmit a high rate real-time streaming data. A second communications device receives the request and schedules the dedicated service periods and one or more contention based periods. A third communications device receives the high rate real-time streaming data and requests the first communications device to re-transmit a portion of the high rate real-time streaming data. The request includes information about the high rate real-time streaming data and information pertinent to a probability of re-transmission. The contention based periods are scheduled to provide the first communications device having higher priority over communications devices of the communications system. The first communications device transmits the high rate real-time streaming data using the dedicated service periods, and re-transmits the portion of the high rate real-time streaming data using the contention based periods.

31 Claims, 3 Drawing Sheets

METHOD FOR TRANSMITTING REAL-TIME STREAMING DATA IN A COMMUNICATIONS SYSTEM AND APPARATUSES UTILIZING THE SAME

CROSS REFERENCE TO RELATED APPLICATIONS

This application claims the benefit of U.S. Provisional Application No. 61/111,362 filed Nov. 5, 2008, and entitled "A METHOD FOR SCHEDULING RE-TRANSMISSION DATA". The entire contents of which are hereby incorporated by reference.

BACKGROUND OF THE INVENTION

1. Field of the Invention

The invention relates to a method for transmitting high rate real-time streaming data in a communications system.

2. Description of the Related Art

Designing a Media Access Control (MAC) protocol for a wired or wireless link is a really important task in a communications system, and most MAC protocol is designed for transmitting compressed low rate streaming data. It has been quite challenging to design for high rate real time streaming data because the high rate real-time streaming data contains some unique characteristics. A high rate real-time streaming data comprises a sequence of data packets forming a data flow arrived at a constant rate. The high rate real-time streaming data arrives at a communications device isochronously. The term isochronous means that data packets usually appear regularly according to a predetermined frequency, and each data packet has a predetermined duration. Importantly, there is no flow control to throttle the data traffic between source and destination communications device. Once the flow of a high rate real-time streaming data starts, the latency of each data packet must meet a strict time constraint. Otherwise, the data packet is determined as being lost. The latency of a data packet is the time period between the arrival time at the source communications device and the departing time from the destination communications device.

A high definition video stream, for example, a high definition video stream in compliance with a High Definition Multimedia Interface (HDMI) protocol, is one kind of high rate real-time streaming data. Different from compressed video streams, such as the video streams compressed according to MPEG 2 (Moving Picture Experts Group) or MPEG 4 standards having low data rates of about 20 Mbit/sec, the high definition video stream has extremely high data rates up to 3 Gbit/sec or more. The extremely high data rate requires a large amount of transmission bandwidth. In addition, for proper operation, it is critical to design an efficient re-transmission scheme without degrading overall data packets transmissions. Moreover, it is also critical to achieve and maintain high utilization rate of channel resources. Because of the high rate real-time streaming data consumes a large portion of channel bandwidth, a low utilization rate may render the channel unusable for the high rate real-time streaming data.

Therefore, in order to achieve better channel utilization in compliance with the real-time constraint for high-rate real time streaming data, a novel MAC protocol and re-transmission mechanism is highly required.

BRIEF SUMMARY OF THE INVENTION

Communications system and methods for transmitting real-time streaming data in a communications system and for coordinating a high rate real-time streaming data transmission in a communications system are provided. An embodiment of a communications system comprises a first communications device, a second communications device and a third communications device. The first communications device requests one or more dedicated service periods, via a request, to transmit a high rate real-time streaming data. The second communications device receives the request and scheduling the one or more dedicated service periods and one or more contention based periods for the first communications device. The third communications device receives the high rate real-time streaming data and requesting the first communications device to re-transmit a portion of the high rate real-time streaming data in accordance with a first predetermined rule. The request comprises information about the high rate real-time streaming data and information pertinent to a probability of re-transmission. Duration of the one or more dedicated service periods is determined in accordance with a second predetermined rule. The one or more contention based periods are scheduled in accordance with a third predetermined rule to provide the first communications device having higher priority over a plurality of communications devices of the communications system. The first communications device transmits the high rate real-time streaming data using the one or more dedicated service periods, and re-transmits the portion of the high rate real-time streaming data using the one or more contention based periods.

In addition, a method for transmitting real-time streaming data in a communications system is provided, comprising: requesting one or more dedicated service periods for a source communications device, via a request, to transmit a high rate real-time streaming data, wherein the request comprises information about the high rate real-time streaming data and information pertinent to a probability of re-transmission; receiving scheduling information about the one or more dedicated service periods in accordance with a first predetermine rule and one or more contention based periods, wherein the duration of the one or more contention based periods is determined in accordance with a second predetermined rule; transmitting the high rate real-time streaming data using the one or more dedicated service periods to a communications device; and re-transmitting a portion of the high rate real-time streaming data to the communications device using the one or more contention based periods, wherein the re-transmitting having priority over other data transmission from a plurality of communications devices of the communications system.

A method for coordinating a high rate real-time streaming data transmission in a communications system comprising: receiving at least one request from a first communications device, wherein the request comprises information about a high rate real-time streaming data and information pertinent to a probability of re-transmission; scheduling one or more dedicated service periods in accordance with a first predetermined rule for the first communications device to transmit the high rate real-time streaming data; and allocating one or more contention based period in accordance with a second predetermined rule; wherein the first communications device is granted to have priority over a plurality of communication devices of the communications system to access the one or more contention based period and re-transmit a portion of the high rate real-time streaming data.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
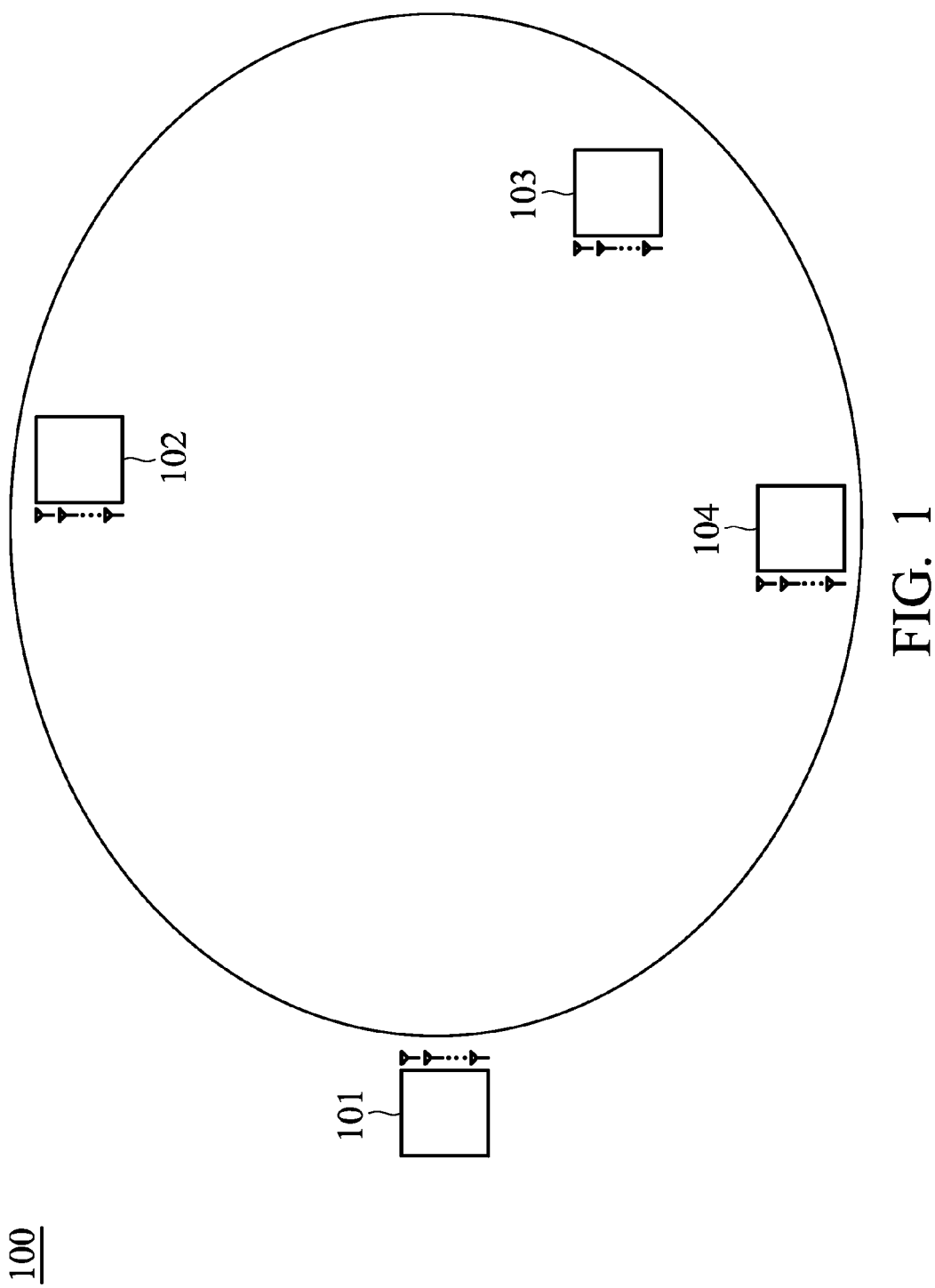
FIG. 1 shows a communications system according to an embodiment of the invention.

The present invention discloses a method to allocate channel resource for a communications device in a communications system employing a hybrid multiple access control protocol. The method realizes the deterministic of a coordinated based multiple access control protocol and the flexibility of a contention based multiple access control protocol, and the present invention may be applied to a wired and wireless link. FIG. 1 shows a communications system according to an embodiment of the invention. A communications system 100 comprises a plurality of communications devices, for example, the communications devices 101~104. According to an embodiment of the invention, at least one communications devices may act as the coordinating communications device(s) managing the channel resource, one communications device may act as a source communications device transmitting the high rate real-time streaming data, and one or more communications devices may act as the destination communications devices receiving the high rate real-time streaming data from the source communications device. For some embodiments, the coordinating communications device is the same as the destination communication device.

According to an embodiment of the invention, the source communications device (as an example, the communications device 102) may request one or more dedicated service periods from at least one coordinating communications device by requesting channel resource to transmit the high rate real-time streaming data. The request may comprise information about the high rate real-time streaming data and information pertinent to a probability of re-transmission. The at least one coordinating communications device (as an example, the communications device 101) may receive the request and schedule the one or more dedicated service periods and one or more contention based periods for the source communications device. According to the embodiments of invention, the one or more dedicated service periods may be coordinated service periods in compliance with the coordinated multiple access control protocol. The source communications device may request channel resources from the at least one coordinating device. The at least one coordinating device determines the allocation of channel resources, access times and durations, for a requesting communications device. The channel access time is determined once the resource is allocated.

Meanwhile, the one or more contention based periods may be the contention based service periods in compliance with the contention based multiple access control protocol. The contention based multiple access control protocol follows the principle of "listen before send". The Carrier Sensing Multiple Access/Collision Detection (CSMA/CD) is one of the contention based multiple access control protocols used by a wired network. The Carrier Sensing Multiple Access/Collision Avoidance (CSMA/CA) is another contention based multiple access control protocol used by a wireless network. A random back-off procedure is employed when collisions occur. According to the contention based multiple access control protocol, the communications devices contend for the channel resources, and access times, of a link. No channel resource is pre-allocated. The decision for when to contend for a channel resource is a local decision, i.e. by a communications device. Therefore, no coordinating device is required to manage the channel resource, channel access time and latency are undeterministic for the contention based service periods.

According to an embodiment of the invention, duration of the one or more contention based periods scheduled by the coordinating communications device is computed in accordance with the information pertinent to the probability of re-transmission, and the one or more contention based periods are scheduled in accordance with a contention-period predetermined rule to provide the source communications device having priority over a plurality of communications devices of the communications system. In other words, the coordinating device grants the source communications device the highest priority in accessing the one or more contention based periods. According to an embodiment of the invention, the reservation of the contention-based service period may be based on the information pertinent to the probability of the re-transmission. The information pertinent to the probability of re-transmission may comprise an error probability of a physical link of a communication channel and duration reserved for the re-transmitted data packet. After receiving a grant message for the request from the coordinating communications device, the source communications device may begin transmitting the high rate real-time streaming data using the one or more dedicated service periods, and may re-transmit a portion of the high rate real-time streaming data using the one or more contention based periods. Details of the session setup and operations of the proposed scheduling algorithm will be described in the following paragraphs.

According to an embodiment of the invention, a communications device may set up an isochronous session with a peer communications device for high rate real-time streaming data transmission by using a secession setup process. One of the communications devices is the source and another one is the target of the high-real real time data stream. The session setup process may comprise determining the duration of one or more isochronous scheduling periods, the frequency of the isochronous scheduling periods, and the probability of the re-transmission in accordance with channel characteristics. According to an embodiment of the invention, duration of the one or more isochronous scheduling periods (i.e. the dedicated service periods) may be determined in accordance with a dedicated-period predetermined rule. As an example, the dedicated-period predetermined rule is to allocate the one or more dedicated service periods spaced evenly over time. Note that in the embodiments of invention, each scheduling period has an exact duration. Duration of the one or more dedicated service periods is scheduled having the same duration to send one or more data packets of the one or more high rate real-time streaming data. After determining the duration and frequency of one or more isochronous scheduling periods and the probability of the re-transmission, the source communications device may send the channel resource reservation request to the coordinating communications device in the communications system which employs the proposed hybrid multiple access protocol. As previously described, the request may comprise information about the high rate real-time streaming data and information pertinent to a probability of re-transmission. According to an embodiment of the invention, the information about the high rate real-time streaming data may comprise a duration and a frequency of one or more isochronous scheduling periods of the high rate real-time streaming data determined in the session setup process. According to another embodiment of the invention, the information about the high rate real-time streaming data comprises a duration of one or more isochronous data packets of the high rate real-time streaming data and a frequency of the one or more isochronous data packets of the high rate real-time streaming data.

After receiving the channel resource reservation request, the coordinating communication device allocates channel resources according to the channel resource reservation request. According to the embodiment of the invention, one or more isochronous scheduling periods may be pre-allocated for the high-rate data stream by the coordinating communication device, and at least one contention period dovetailing at least one isochronous scheduling period may also be pre-allocated. Note that in the embodiment of the invention, the duration of the one or more contention based periods may be computed by using the probability of re-transmission in accordance with a predetermined rule.

After receiving the grant message for the request from the coordinating communication device for granting the channel resource allocations, the source communications device may begin to transmit the high rate real-time streaming data to one or more destination communications device (as an example, the communications device 101, 103 and/or 104) using the one or more dedicated service periods. The destination communications device receives the high rate real-time streaming data and, if necessary, requests the first communications device to re-transmit a portion of the high rate real-time streaming data in accordance with a re-transmission predetermined rule. As an example, the re-transmission determined rule is to re-transmit the portion of high rate real-time streaming data having unrecoverable error. Note that according to an embodiment of the invention, the coordinating communication device and the destination communication device may be the same device for receiving the request, scheduling the one or more dedicated service periods and the one or more contention based period of the first communication device, receiving the high rate real-time streaming data and requesting the source communication device to re-transmit the portion of the high rate real-time streaming data. The one or more data packets of the high rate real-time streaming data meet the real-time constraint of the data flow. Additionally, utilization rate of the pre-allocated isochronous scheduling periods (i.e. the dedicated service periods) is 100 percent.

Figure 2:
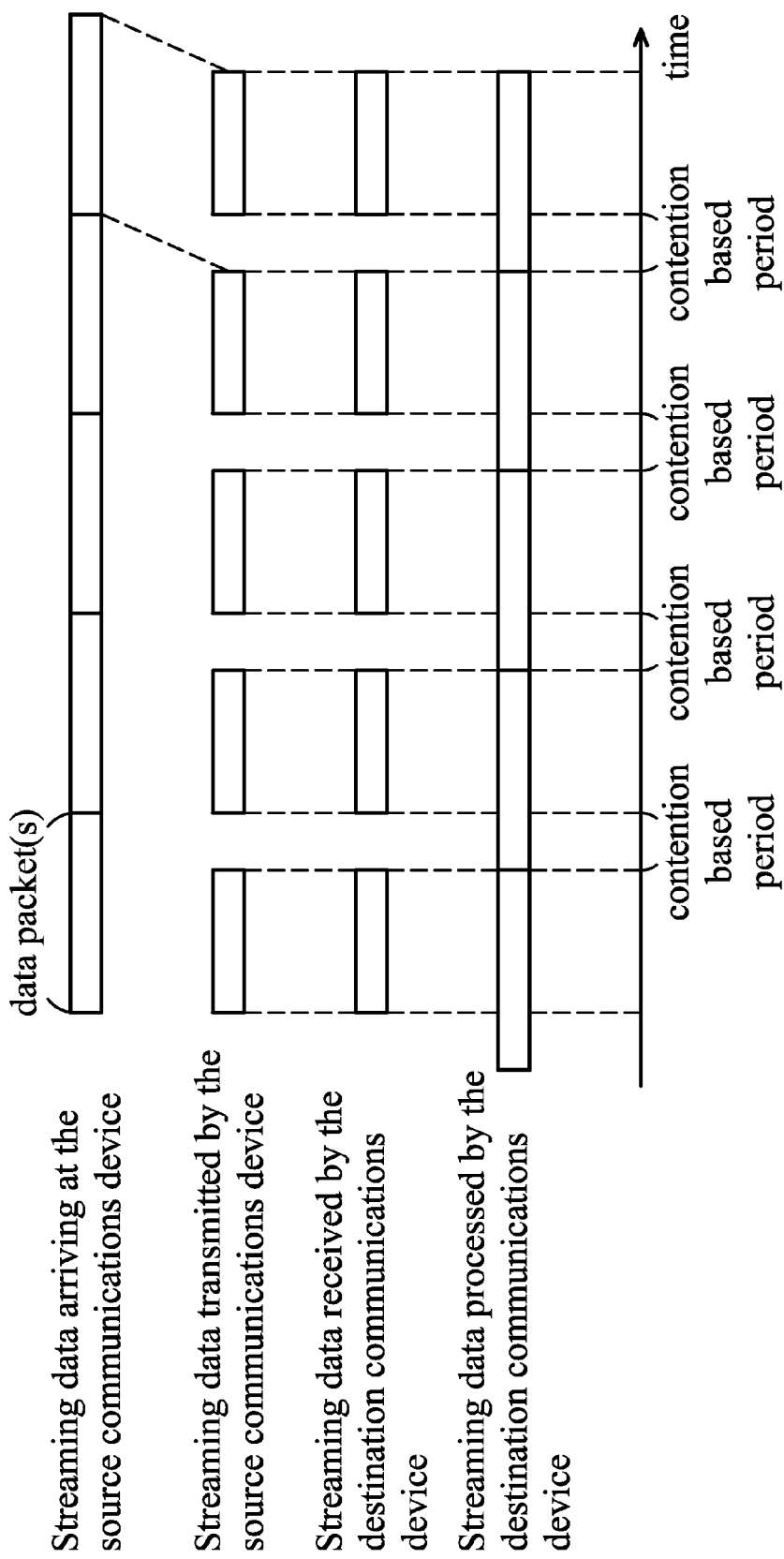
FIG. 2 shows the data packets of high rate real-time streaming data according to an embodiment of the invention.

FIG. 2 shows the data packets of high rate real-time streaming data according to an embodiment of the invention. The first row of data packets represents the streaming data arriving at the source communications device, the second row of data packets represents the streaming data transmitted by the source communications device, the third row of data packets represents the streaming data received by the destination communications device, and the fourth row of data packets represents the streaming data processed (as an example, played) by the destination communications device. As shown in FIG. 2, the latency of a data packet is the time period between the arrival time at the source communications device and the departing time from the destination communications device. Because the reception rate of the destination communications device is generally faster than the processing rate of the destination communications device (as shown in the third and fourth rows in FIG. 2), the time difference therebetween may be provided as the one or more contention based periods for data retransmission. Therefore, according to another embodiment of the invention, the duration of the one or more dedicated service periods may be determined in accordance with at least one of an arrival rate of the one or more high rate real-time streaming data arriving at the source communications device, a data rate of the communications link between the source and destination communications devices and a data processing rate of the destination communications device for processing the received one or more high rate real-time streaming data. One or more isochronous scheduling periods are pre-allocated for the high-rate data stream. The duration of the contention period is computed in accordance with the information pertinent to probability of the re-transmission. Once the isochronous scheduling periods are pre-allocated, at least one contention period is allocated at the end of each scheduling dedicated service period. In other embodiments, at least one contention period may be allocated at the end of at least one of the dedicated service period. According to yet another embodiment of the invention, duration of the one or more contention based periods may also be determined according to information provided by the destination or coordinating communications device, and the information is computed by the destination or coordinating communications device.

The destination communications device may receive the one or more high rate real-time streaming data and error check the received one or more high rate real-time streaming data. When discovering that one or more data packets of the received one or more high rate real-time streaming data suffer from unrecoverable error, the destination communications device may further issue at least one re-transmission request to the source communications device. After receiving the re-transmission request, the source communications device may re-transmit the one or more data packets having unrecoverable error, or some of the one or more data packets which facilitate an error concealment process at the destination communications device. The source communications device re-transmits the one or more data packets by using the one or more contention based periods. According to an embodiment of the invention, each contention based period may be allocated at the end of each dedicated service period, as shown in FIG. 2. According to another embodiment of the invention, at least one contention based period may be allocated at the end of at least one dedicated service period. By having the highest priority to access the one or more contention based period, the source communication device is guaranteed the access of channel resources. The re-transmitted data is also guaranteed to meet timing constraints of the data flow. Note that according to an embodiment of the invention, if the one or more data packets arriving at the destination communications device do not suffer from any error, the one or more contention based periods may be accessed by other communications devices of the communications system using a contention based protocol. Therefore, utilization of the channel resource is not degraded due to over-allocation of channel resources to the source communications device.

Figure 3:
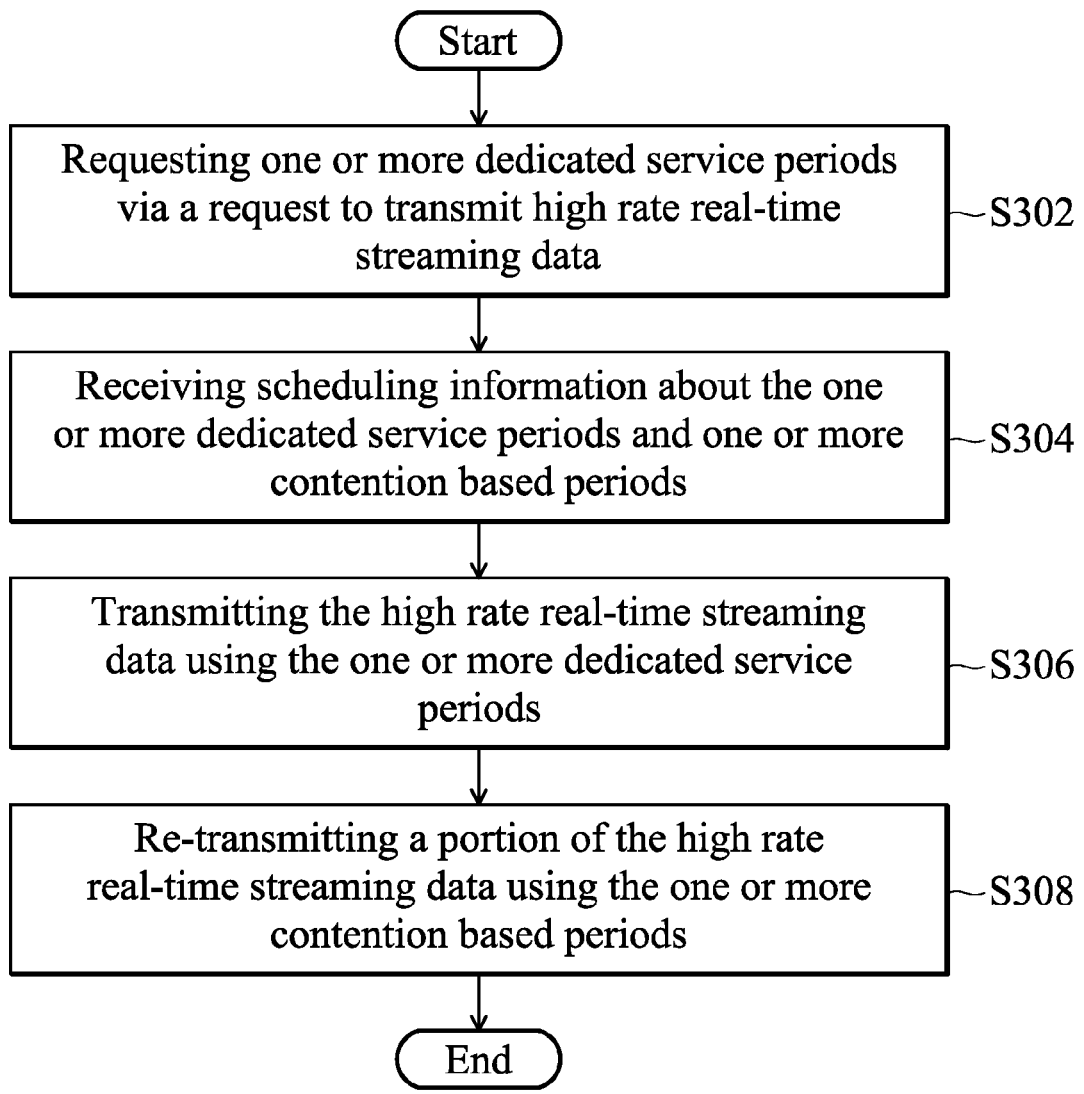
FIG. 3 shows a flow chart of a method for transmitting real-time streaming data in a communications system according to an embodiment of the invention.

FIG. 3 shows a flow chart of a method for transmitting real-time streaming data in a communications system according to an embodiment of the invention. Firstly, the source communications device requests one or more dedicated service periods via a request to transmit high rate real-time streaming data (Step S302). The request comprises information about the high rate real-time streaming data and information pertinent to a probability of re-transmission. Next, the source communications device receives scheduling information about the one or more dedicated service periods and one or more contention based periods (Step S304). The duration of the one or more contention based periods is determined in accordance with a predetermined rule. The one or more contention based periods are scheduled to provide the source communications device having priority over a plurality of communications devices of the communications system. Next, the source communications device transmits the high rate real-time streaming data using the one or more dedicated service periods (Step S306). Finally, if necessary, the source communications device re-transmits a portion of the high rate real-time streaming data using the one or more contention based periods (Step S308).

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communications system, comprising:
a first communications device, requesting one or more dedicated service periods, via a request, to transmit a high rate real-time streaming data;
a second communications device, receiving the request and scheduling the one or more dedicated service periods and one or more contention based periods for the first communications device; and
a third communications device receiving the high rate real-time streaming data and requesting the first communications device to re-transmit a portion of the high rate real-time streaming data in accordance with a first predetermined rule,
wherein the request comprises information about the high rate real-time streaming data and information pertinent to a probability of re-transmission;
wherein duration of the one or more dedicated service periods is determined in accordance with a second predetermined rule, and wherein the one or more contention based periods are scheduled in accordance with a third predetermined rule to provide the first communications device having higher priority over a plurality of communications devices of the communications system, wherein the first communications device transmits the high rate real-time streaming data using the one or more dedicated service periods, and re-transmits the portion of the high rate real-time streaming data using the one or more contention based periods.

2. The communications system as claimed in claim 1, wherein the information about the high rate real-time streaming data comprises a duration and a frequency of one or more isochronous scheduling periods of the high rate real-time streaming data.

3. The communications system as claimed in claim 1, wherein the first determined rule is to re-transmit the portion of high rate real-time streaming data having unrecoverable error.

4. The communications system as claimed in claim 1, wherein the second predetermined rule is to allocate the one or more dedicated service periods spaced evenly over time.

5. The communications system as claimed in claim 1, wherein the third determined rule is based on the information pertinent to the probability of the re-transmission.

6. The communications system as claimed in claim 5, wherein the information pertinent to the probability of the re-transmission is an error probability of a physical link of a communication channel.

7. The communications system as claimed in claim 5, wherein the information pertinent to the probability of the re-transmission is duration reserved for the re-transmitted data packet.

8. The communications system as claimed in claim 1, wherein the second communication device and the third communication device are the same device for receiving the request, scheduling the one or more dedicated service periods and the one or more contention based period of the first communication device, receiving the high rate real-time streaming data and requesting the first communication device to re-transmit the portion of the high rate real-time streaming data.

9. The communications system as claimed in claim 1, wherein the second predetermined rule is determined in accordance with at least one of an arrival rate of the one or more high rate real-time streaming data arriving at the first communications device, a data rate of the communications link between the first and third communications devices and a data processing rate of the third communications device for processing the received one or more high rate real-time streaming data.

10. The communication system as claimed in claim 1, wherein a duration of the one or more contention based periods are computed in accordance with the information pertinent to the probability of re-transmission.

11. The communication system as claimed in claim 1, wherein the third predetermined rule is to allocate each contention base period at the end of each dedicated service period.

12. The communications system as claimed in claim 1, wherein the third predetermined rule is to allocate at least one contention base period at the end of at least one dedicated service period.

13. The communications system as claimed in claim 1, wherein there is no flow control mechanism for the high rate real-time streaming data.

14. The communications system as claimed in claim 1, wherein the one or more contention base periods are accessible by the plurality of communications devices of the communications system.

15. The communications system as claimed in claim 1, wherein the first communications device has the highest priority to access the one or more contention based periods.

16. A method for transmitting real-time streaming data in a communications system comprising:
requesting one or more dedicated service periods, via a request, to transmit a high rate real-time streaming data, wherein the request comprises information about the high rate real-time streaming data and information pertinent to a probability of re-transmission;
receiving scheduling information about the one or more dedicated service periods in accordance with a first predetermine rule and one or more contention based periods, wherein the duration of the one or more contention based periods is determined in accordance with a second predetermined rule;
transmitting the high rate real-time streaming data using the one or more dedicated service periods to a communications device; and
re-transmitting a portion of the high rate real-time streaming data to the communications device using the one or more contention based periods, wherein the re-transmitting having priority over other data transmission from a plurality of communications devices of the communications system.

17. The method as claimed in claim 16, wherein the information about the high rate real-time streaming data comprises a duration of one or more isochronous data packets of the high rate real-time streaming data and a frequency of the one or more isochronous data packets of the high rate real-time streaming data.

18. The method as claimed in claim 16, wherein the duration of the one or more contention based periods is computed by using the information pertinent to probability of re-transmission in accordance with a predetermined rule.

19. The method as claimed in claim 16, further comprising:
   receiving at least one re-transmission request from a second communications device;
   wherein the second communications device receives the one or more high rate real-time streaming data and error checks the received one or more high rate real-time streaming data, and when discovering that one or more data packets of the received one or more high rate real-time streaming data suffer unrecoverable error, the second communications device issues the at least one re-transmission request.

20. The method as claimed in claim 16, wherein the first predetermined rule is to allocate the one or more dedicated service periods spaced evenly over time.

21. The method as claimed in claim 16, wherein the second predetermined rule is to compute the duration of the one or more contention based periods is in accordance with the probability of re-transmission.

22. The method as claimed in claim 16, wherein the information pertinent to the probability of re-transmission is an error probability of a physical link of a communication channel.

23. The method as claimed in claim 16, wherein the information pertinent to the probability of re-transmission is duration reserved for the retransmitted high rate real-time streaming data.

24. The method as claimed in claim 16, wherein the first predetermine rule comprises at least one of an arrival rate of the one or more high rate real-time streaming data arriving at the first communications device, and a data rate of the communications link between the first and other communications devices.

25. The method as claimed in claim 16, wherein each contention base period is allocated at the end of each dedicated service period.

26. The method as claimed in claim 16, wherein at least one contention base period is allocated at the end of at least one dedicated service period.

27. The method as claimed in claim 16, wherein the portion of the high rate real-time streaming data for re-transmitting has the highest priority to access the one or more contention based periods.

28. A method for coordinating a high rate real-time streaming data transmission in a communications system comprising:
   receiving at least one request from a first communications device, wherein the request comprises information about a high rate real-time streaming data and information pertinent to a probability of re-transmission;
   scheduling one or more dedicated service periods in accordance with a first predetermined rule for the first communications device to transmit the high rate real-time streaming data;
   allocating one or more contention based period in accordance with a second predetermined rule;
   wherein the first communications device is granted to have the highest priority over a plurality of communication devices of the communications system to access the one or more contention based period and re-transmit a portion of the high rate real-time streaming data.

29. The method as claimed in claim 28, wherein the first predetermined rule is to allocate the one or more dedicated service periods spaced evenly over time.

30. The method as claimed in claim 28, wherein the second predetermined rule is to allocate each contention based period at the end of each dedicated service period.

31. The method as claimed in claim 28, wherein the second predetermined rule is to allocate at least one contention based period at the end of at least one dedicated service period.

\* \* \* \* \*